United States Patent [19]

Chen

[11] Patent Number: 5,002,823
[45] Date of Patent: Mar. 26, 1991

[54] REINFORCED COMPOSITES HAVING IMPROVED FLEX FATIGUE LIFE

[75] Inventor: Eric J. H. Chen, Hockessin, Del.

[73] Assignee: E. I. Du Pont de Nemours and Company, Wilmington, Del.

[21] Appl. No.: 303,053

[22] Filed: Jan. 27, 1989

Related U.S. Application Data

[63] Continuation of Ser. No. 60,864, Jun. 12, 1987, abandoned.

[51] Int. Cl.$^5$ .............................................. D04H 1/58
[52] U.S. Cl. ................................. 428/288; 428/375; 428/378; 428/396; 428/902
[58] Field of Search ............... 428/375, 378, 396, 288, 428/287, 290

[56] References Cited

U.S. PATENT DOCUMENTS

| | | | |
|---|---|---|---|
| 3,755,061 | 8/1973 | Schurb | 428/294 |
| 3,881,977 | 5/1975 | Dauksys | 156/242 |
| 3,964,952 | 6/1976 | Brie et al. | 156/296 |
| 4,056,651 | 11/1977 | Scola | 428/336 |
| 4,214,932 | 7/1980 | Van Auken | 428/36 |
| 4,216,262 | 8/1980 | Goan | 428/367 |
| 4,219,457 | 8/1980 | Taniguchi et al. | 428/367 |
| 4,328,151 | 5/1982 | Robinson | 523/205 |
| 4,439,556 | 3/1984 | Girgis | 523/206 |
| 4,486,373 | 12/1984 | Kurauchi et al. | 264/142 |
| 4,559,262 | 12/1985 | Cogswell et al. | 428/294 |
| 4,659,752 | 4/1987 | Piret | 523/206 |
| 4,883,712 | 11/1989 | Ogawa et al. | 428/367 |

FOREIGN PATENT DOCUMENTS 47-757 6/1972 Japan.
1570000 6/1976 United Kingdom.

*Primary Examiner*—George F. Lesmes
*Assistant Examiner*—Christopher Brown

[57] ABSTRACT

Composite of improved flex fatigue life comprising 50 to 70 volume percent reinforcing filaments of carbon, aramid or glass uniformly coated with a polymer in a polymeric matrix. The Young's modulus of the filament coating polymer is intermediate the Young's modulus of the filament and the matrix polymer.

4 Claims, 2 Drawing Sheets

REINFORCED COMPOSITES HAVING IMPROVED FLEX FATIGUE LIFE

This is a continuation of application Ser. No. 07/060,864, filed June 12, 1987, now abandoned.

BACKGROUND OF THE INVENTION

The use of p-aramid, carbon and glass fiber in the reinforcement of organic polymer matrices of composites is disclosed in U.S. Pat. No. 4,511,690 and other prior art. Fiber surface coatings are also prescribed in some prior art to either enhance or diminish the adhesion of the matrix material to the fibrous reinforcement. A combination of fiber, fiber coating and matrix has now been found which greatly improves the level of flex fatigue life of composites well beyond that exhibited in the absence of the fiber coating. This quality is of importance in end uses, such as axles, aircraft wings, and automotive leaf springs.

THE FIGURES

FIGS. 1A-2B are photomicrographs taken at a magnification of 1000 × of sections of coated fiber.

SUMMARY OF THE INVENTION

A unidirectional composite of improved flex fatigue life comprising a matrix of thermoplastic or thermoset organic polymer reinforced with generally aligned filaments selected from the group of carbon, aramid or glass, said filaments having a uniform coating of between 1 and 12% by wt. based on the filament wt. of a thermoplastic or thermoset organic polymer, and said filament coating having a modulus intermediate that of the matrix polymer and the filament.

DETAILED DESCRIPTION OF THE INVENTION

Figure 1A:
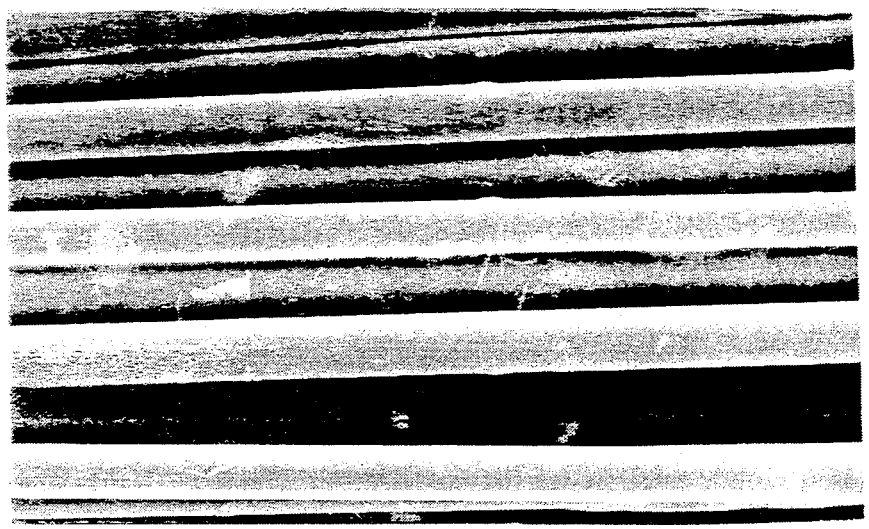

This invention resides in the discovery that the presence of a uniform coating or interphase of a polymer of a selected modulus on carbon, aramid or glass filaments will greatly enhance the flex fatigue life of unidirectional composites in which the polymeric matrix is reinforced with such filaments. The modulus of the polymeric coating on the filaments must lie between that of the filament and the modulus of the matrix polymer.

The filaments that are useful in the present invention are carbon (also commonly referred to as "graphite" filament), aramid, and glass. The carbon filaments may be PAN-based or pitch-based. Graphite fiber Type AS-4 is a high-strength PAN-based fiber produced by Hercules Incorporated. The AS-4 yarn employed in the examples below had a nominal denier of 7895 and contained 12,000 filaments. "Aramid" is used to designate wholly aromatic fibers, such as, for example, poly(p-phenylene terephthalamide) or poly(m-phenylene isophthalamide filaments produced by E. I. du Pont de Nemours and Company. The "Kevlar" 49 aramid yarn employed in the examples below was untwisted poly(p-phenylene terephthalamide) yarn of about 1420 denier having 1000 filaments. The glass filament reinforcement fiber may be E-glass (a lime-borosilicate glass from Owens-Corning Fiberglas Corp.) The glass yarn employed in the examples was untwisted, had a nominal denier of 19,930 and contained 4000 filaments. The filaments in all the yarns were generally aligned and substantially finish-free. Since it is important that the filaments be uniformly coated as discussed in greater detail herein, the use of untwisted, essentially finish-free filaments is highly recommended. Preferably, the composites should contain from 20 to 80 volume percent, and still more preferably from 50 to 70 volume percent of fiber based on the composite.

The coatings to be applied to the filaments may be synthetic organic polymers of the thermoplastic or thermosetting variety. As thermoplastic polymers for the coating, one may employ, for example, polyimides. Among those illustrated below are RC-5069 which is poly-4,4'-oxydianiline pyromellitimide. As thermosetting polymers for the coating, one may employ, for example, epoxy resins. "Thermid" IP-600 which is an acetylene-terminated polyisoimide precursor is illustrated below as a thermosetting resin. It is important, however, to select a polymer having a Young's modulus less than that of the reinforcing filament, but greater than that of the matrix polymer. As a minimum, an amount of coating should be used which is sufficient to uniformly coat the surface of the reinforcing filaments. At least 1% and not more than 12%, preferably not more than 7%, by weight of such coating based on the filament weight should be used. It has been found that greater amounts may cause a sharp drop-off in flex fatigue life of the composite probably because this interlayer begins to act as a matrix rather than as an intermediate phase.

The coating must be applied uniformly. In the examples which follow, it will be observed that flex fatigue life properties suffer if the coating is spotty and non-uniform.

Figure 1B:
Figure 2A:
Figure 2B:

Referring to the Figures, the differences in uniformity of coating becomes apparent. In FIG. 1, A and B segments of AS-4 fiber coated with 5% by wt. of "Thermid" IP-600 are shown at a magnification of 1000 ×. The coated product of FIG. 1A was prepared by dipping the filaments into a coating solution bath and then passing the coated filaments through a vertical column to assure coating uniformity. Upon leaving the bath, contact of the coated filaments with rolls was avoided until the coating was sufficiently dry for handling without disruption of the coating. In FIG. 1B, the same materials were employed except that only a horizontal dipping bath was used and as can be seen in the photomicrograph, the result was a non-uniformly coated product, outside the invention. FIGS. 2 A and B show aramid fibers coated similarly to FIGS. 1 A and B, respectively.

While the modulus of the interphase layer must lie between that of the filament reinforcement and that of the matrix polymer, it is much preferred that the modulus ratio between the filament and interphase lie between 10 and 120 and that the modulus ratio between the interphase and the matrix polymer lie between 1 and 10.

The matrix polymer useful in the present invention is also selected from synthetic organic polymers of either the thermoplastic or thermoset type. It will have a modulus well below that of the fibers dealt with herein. As the matrix polymer, there may be employed, for example, PACM-12 from dodecanedioic acid and 4,4'-methylene-bis(cyclohexylamine).

Test Procedures

Flex Fatigue Life is measured in accordance with a modification of ASTM D 790. The fatigue load was varied sinusoidally at the 5 Hz between a minimum of 10 Ksi and a maximum of 80% of the ultimate static flexural strength. The flex fatigue life is defined as the number of cycles a specimen survived until fracture.

Tensile Properties—Young's Modulus is measured in accordance with ASTM D 638.

The following examples of unidirectional composites are offered as illustrative of the invention and are not to be construed as limiting or as the sum total of the runs performed. Application of uniform coating of interphase polymer on the filaments was readily achieved by guiding the coated yarns vertically through a zone immediately after application of the coating solution.

EXAMPLE 1

This example compares the flexural fatigue life of unidirectional PACM-12 matrix composites reinforced with AS-4 carbon fiber or "Kevlar" 49 fiber with "Thermid" IP-600 coated (as an interphase) counterparts. "Thermid" IP-600, manufactured by National Starch and Chemical Corporation, is a thermosetting polyimide which has a Young's modulus of 750 Ksi, whereas the moduli for AS-4, "Kevlar" 49 and PACM-12 are 34,000, 18,000 and 320 Ksi, respectively.

The yarn bundles were first dipped into a solution bath containing 4% of "Thermid" IP-600 in tetrahydrofuran. Immediately after that, the coated yarns were guided through a vertical zone to achieve coating uniformity. The AS-4 yarn picked up 4.5% polymer coating based on fiber weight, while the "Kevlar" 49 yarn picked up 5.8% polymer coating. The coated yarns were then put into a temperature controlled oven initially set at 130° C. to remove residual solvent for an hour, followed by a curing process with a heating rate of 3° C./min. until it reached 360° C., then allowed to cool. The completely cured coated yarns were then passed over several tension bars to spread the filaments, so that matrix melt can penetrate into yarn bundles in the following step.

The composites were prepared by applying a film of PACM-12 to both sides of a warp of the coated reinforcing filaments to make a sandwich which under heat (300°–315° C.) and pressure (840 psi) forms a reinforced sheet. A plurality of such sheets were stacked to make a panel (7×7 inch) ca. 0.1 inch thick after consolidation by compression molding at 300°–315° C. and a pressure of 1000 psi for 30 minutes. After cooling, test bars of appropriate size were cut from the panels parallel to a principle direction of the reinforcement.

Data on the comparison of the flexural fatigue life for these systems appear in TABLE 1 below. $E_f$, $E_I$ and $E_m$ represent the moduli of the filaments, interphase and matrix, respectively.

TABLE 1

FLEXURAL FATIGUE LIFE COMPARISON
(Fiber Loading: ~60%)

| System | $E_f/E_I$ | $E_f/E_m$ | $E_I/E_m$ | Flex Fatigue Life*, Cycles |
|---|---|---|---|---|
| AS-4/PACM-12 (Control) | — | 106.3 | — | 1,770 |
| AS-4/"Thermid" IP-600/PACM-12 | 45.3 | — | 2.3 | 1,697,500 |
| "Kevlar" 49/PACM-12 (control) | — | 56.3 | — | 29,050 |
| "Kevlar" 49/"Thermid" IP-600/PACM-12 | 24 | — | 2.3 | 2,796,200 |

*The fatigue load was varied sinusoidally at 5 Hz between a minimum of 12.8 KSI and a maximum of 128 KSI for both AS-4 systems; a minimum of 10 KSI and a maximum of 80 KSI for both "Kevlar" 49 systems.

The above data show significant improvements (two to three orders of magnitude) obtained in use of a thermosetting interphase ("Thermid" IP-600) with an intermediate modulus over PACM-12 in carbon or "Kevlar" 49 reinforced composites with regard to composite flex fatigue life.

EXAMPLE 2

This example compares the flexural fatigue life of unidirectional PACM-12 matrix composites reinforced with AS-4 carbon fiber or "Kevlar" 49 fiber with "Avimid" N coated (as an interphase) counterparts.

"Avimid" N, manufactured by E. I. du Pont de Nemours and Company, is a thermosetting polyimide, which has a Young's modulus of 520 KSI and is prepared from an aromatic diamine and a tetraacid having 6 fluorine atoms. Unidirectional composites were prepared by the same coating and consolidation processes as described in Example 1. The polymer pick-up on both yarns was 4.4% by weight. Data on the flexural fatigue life as in Example 1 are compared in TABLE 2.

TABLE 2

Flexural Fatigue Life Comparison
(Fiber loading: ~16%)

| System | $E_f/E_I$ | $E_f/E_m$ | $E_I/E_m$ | Flex Faigue Life, Cycles |
|---|---|---|---|---|
| AS-4/PACM-12 (control) | — | 106.3 | — | 1,770 |
| AS-4/"Avimid" N/PACM-12 | 65.4 | — | 1.6 | 16,850 |
| "Kevlar" 49/PACM-12 (control) | — | 56.3 | — | 29,050 |
| "Kevlar" 49/"Avimid" N/PACM-12 | 34.6 | — | 1.6 | 728,744 |

The above data also show marked improvements obtained in composites with an intermediate modulus interphase. However, the improvement is less compared with those of Example 1.

EXAMPLE 3

The example compares the flexural fatigue life of unidirectional PACM-12 matrix composites reinforced with "Kevlar" 49 or E-glass fiber with RC-5069 coated (as an interphase) counterparts. "RC-5069", manufactured by E. I. du Pont de Nemour and Company, is a thermoplastic polyimide which has a Young's modulus of 450 KSI. The sizing and finishing materials were removed from the glass fiber by burning prior to coating.

Unidirectional composites were prepared by the same coating (pick-up of polymer=3.3%) and consolidation processes as described in Example 1, except that the curing process is not necessary for the thermoplastic interphase. Data on the flexural fatigue life are compared in TABLE 3.

TABLE 3

Flexural Fatigue Life Comparison
(Fiber loading: ~60%)

| System | $E_f/E_I$ | $E_f/E_m$ | $E_I/E_m$ | Flex Faigue Life**, Cycles |
|---|---|---|---|---|
| "Kelvar" 49/PACM-12 (control) | — | 56.3 | — | 29,050 |
| "Kelvar" 49/RC-5069/PACM-12 | 40 | — | 1.4 | 1,677,000 |
| E-glass/PACM-12 (control) | — | 28.1 | — | 6,800 |
| E-glass/RC-5069/ | 20 | — | 1.4 | 17,800 |

TABLE 3-continued

Flexural Fatigue Life Comparison
(Fiber loading: ~60%)

| System | $E_f/E_I$ | $E_f/E_m$ | $E_I/E_m$ | Flex Fatigue Life**, Cycles |
|---|---|---|---|---|
| PACM-12 | | | | |

**The fatigue load was varied sinusoidally at 5 Hz between a minimum of 11.2 KSI and a maximum of 112 KSI for both E-glass systems.

EXAMPLE 4

This example compares the flexural fatigue life of unidirectional "Avimid" K matrix composites with "Kevlar" 49 fiber with "Thermid" IP-600 coated (as an interphase) counterparts.

"Avimid" K, used as a matrix in this example, manufactured by E. I. du Pont de Nemours and Company, is a thermosetting polyimide which has a Young's modulus of 550 KSI. The polyimide is based on pyromellitic dianhydride and 2,2-bis[3,5-dichloro-4-(4-aminophenoxy)phenyl]propane.

The same coating procedure (polymer pick-up of 5.8%) were used as described in Example 1 to coat and cure "Thermid" IP-600 onto "Kevlar" 49 fiber. The composites were prepared by a typical thermosetting composite manufacturing method—B-staging and complete-curing. After cooling, test bars of appropriate size were cut from the panels parallel to the principle direction of reinforcement. Data on the flexural fatigue life comparison for these two systems are in TABLE 4 below.

TABLE 4

Flexural Fatigue Life Comparison
(Fiber Loading: ~60%)

| System | $E_f/E_I$ | $E_f/E_m$ | $E_I/E_m$ | Flex Fatigue Life, Cycles |
|---|---|---|---|---|
| "Kelvar" 49/"Avimid" K (control) | — | 32.7 | — | 710,000 |
| "Kevlar" 49/"Thermid" IP-600/"Avimid" K | 24 | — | 1.36 | 6,635,000 |

EXAMPLE 5

This example compares the flexural fatigue life of a thermoplastic matrix unidirectional composite reinforced with AS-4 carbon fiber with "Thermid" IP-600 coated (as an interphase) counterparts. The matrix polymer of this example is a polyamide having a Young's modulus of 460 KSI. The polymeric (unidirectional) composites were prepared by the same procedures as described in Example 1. The pick-up of polymer coating was 4.5%. Data on the flexural fatigue life are compared in TABLE 5.

TABLE 5

Flexural Fatigue Life Comparison
(Fiber Loading: ~60%)

| System | $E_f/E_I$ | $E_f/E_m$ | $E_I/E_m$ | Flex Fatigue Life, Cycles |
|---|---|---|---|---|
| AS-4/matrix (control) | — | 73.9 | — | 5,100 |
| AS-4/"Thermid" IP-600/matrix | 45.3 | — | 1.63 | 346,800 |

Again, sufficient improvement in flexural fatigue life is obtained in composites with an intermediate modulus interphase.

EXAMPLE 6

The example compares the flexural fatigue life of unidirectional composites using the matrix of Example 5 reinforced with "Kevlar" 49 fiber and with RC-5069 coated (as an interphase) counterparts.

Since the RC-5069 interphase has a modulus of 450 KSI while the matrix has a modulus of 460 KSI, this is an example of a composite (outside the invention) with an interphase having a modulus that is not intermediate that of the reinforcing fiber and the matrix polymer. Unidirectional composites were prepared by the same procedures as described in Example 1. The polymer coating pick-up was 3.3% by weight. Data on the flexural fatigue life are compared in TABLE 6.

TABLE 6

Flexural Fatigue Life Comparison
(Fiber Loading: ~60%)

| System | $E_f/E_I$ | $E_f/E_m$ | $E_I/E_m$ | Flex Fatigue Life, Cycles |
|---|---|---|---|---|
| "Kelvar" 49/matrix (control) | — | 39.1 | — | 175,600 |
| "Kelvar" 49/RC-5069/matrix | 40 | — | 0.98 | 42,700 |

The data above show significant decrease in flexural fatigue life.

EXAMPLE 7

This example gives runs with a range of coating pick-up employing the materials and general procedures of EXAMPLE 1 wherein AS-4 is the fiber, "Thermid" IP-600 is the interphase polymer and PACM-12 is the matrix polymer.

TABLE 7

| Item No. | Soln. Conc. by wt. % | Coating pick-up by wt. % | Flex Fatigue Cycles |
|---|---|---|---|
| 1 | 0.0 | 0.0 | 1,770 |
| 2 | 0.5 | 0.7 | 35,200 |
| 3 | 1.0 | 1.6 | 823,900 |
| 4 | 1.5 | 2.7 | 1,305,000 |
| 5 | 4 | 4.5 | 1,697,500 |
| 6 | 6 | 6.1 | 1,830,200 |
| 7 | 8 | 7.2 | 75,200 |
| 8 | 10 | 7.8 | 400; 700 |

TABLE 7 shows the fall-off in flex fatigue with increased pick-up beyond an optimum range. This is believed to occur at the lower end due to insufficient coating material and at the upper end because the coating begins to act as matrix.

EXAMPLE 8

This example is similar to EXAMPLE 7 and shows the effect of coating pick-up with "Kevlar" 49 Aramid fiber. The results are presented in TABLE 8 below.

TABLE 8

| Item No. | Soln. Conc. by wt. % | Coating Pick-Up by wt. % | Fatigue Cycles |
|---|---|---|---|
| 1 | 0.0 | 0.0 | 29,050 |
| 2 | 0.5 | 0.9 | 6700; 3470 |
| 3 | 1.0 | 1.9 | 1,259,400 |
| 4 | 4.0 | 5.8 | 2,796,200 |
| 5 | 6.0 | 6.9 | 1,327,400 |
| 6 | 10.0 | 7.2 | 1,184,600 |
| 7 | 12.0 | 7.5 | 154,800 |

EXAMPLE 9

This example is a control wherein nickel was used as the interphase. Poor results were obtained.

AS-4 coated with nickel (modulus, 24,000 KSI) was used to reinforce a PACM-12 matrix. The commercial nickel coated yarn was uniformly coated; however, the composite failed in only 20 cycles.

EXAMPLE 10

In this example, the yarn was coated with interphase polymer using only a horizontal dipping bath. The fiber was AS-4, the interphase was "Thermid" IP-600 and the matrix was PACM-12. The coating uniformity was poor. Solution concentration of 1, 3, 4 and 5% were used for the dipping solutions. Flex fatigue cycles to failure fell below 1230 cycles.

In a variation, "Kevlar" 49 Aramid yarn was used in place of the AS-4 and at solution concentration of 3 and 5% by weight. These composites fail in flex fatigue after 10 and 12,300 cycles, respectively.

I claim:

1. A unidirectional composite of improved flex fatigue life containing from 50 to 70 volume percent of fiber, comprising a polymeric matrix reinforced with filaments from the group of carbon, aramid or glass, said filaments bearing a uniform coating of polymer having a modulus intermediate that of the filament and the matrix polymer, the ratio of the modulus of the filaments to the filament coating being from 10 to 120, the ratio of the modulus of the filament coating to the modulus of the matrix polymer being from 1 to 10, and said composite containing from 1 to about 7% by weight of filament coating based on the weight of the fiber.

2. A composite according to claim 1 wherein the filaments are carbon filaments.

3. A composite according to claim 1 wherein the filaments are aramid filaments.

4. A composite according to claim 1 wherein the filaments are glass filaments.

* * * * *